(12) United States Patent
Heer

(10) Patent No.: US 9,256,886 B2
(45) Date of Patent: Feb. 9, 2016

(54) CONTENT RECOMMENDATION SYSTEM AND METHOD

(75) Inventor: David de Heer, Woodside, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 12/911,671

(22) Filed: Oct. 25, 2010

(65) Prior Publication Data

US 2012/0102048 A1 Apr. 26, 2012

(51) Int. Cl.
*G06F 7/00* (2006.01)
*G06Q 30/02* (2012.01)
*G06F 17/30* (2006.01)

(52) U.S. Cl.
CPC ...... *G06Q 30/0201* (2013.01); *G06F 17/30038* (2013.01); *G06F 17/30699* (2013.01); *G06Q 30/02* (2013.01); *G06Q 30/0282* (2013.01)

(58) Field of Classification Search
CPC .................................................. G06F 17/30699
See application file for complete search history.

(56) References Cited

U.S. PATENT DOCUMENTS

| 7,370,031 | B2 | 5/2008 | Kaiser et al. |
| 7,428,496 | B1 | 9/2008 | Keller et al. |
| 7,672,868 | B1* | 3/2010 | Keller et al. ................. 705/7.29 |
| 7,734,641 | B2 | 6/2010 | Kanigsberg et al. |
| 7,747,620 | B2 | 6/2010 | Beaupre |
| 2006/0282336 | A1 | 12/2006 | Huang |
| 2007/0168354 | A1 | 7/2007 | Ramer et al. |
| 2007/0294127 | A1 | 12/2007 | Zivov |
| 2008/0270389 | A1* | 10/2008 | Jones et al. ........................ 707/5 |
| 2008/0288354 | A1* | 11/2008 | Flinn et al. ...................... 705/14 |
| 2009/0070331 | A1* | 3/2009 | Silman ............................. 707/8 |
| 2009/0119258 | A1* | 5/2009 | Petty ................................ 707/3 |
| 2009/0164442 | A1* | 6/2009 | Shani et al. ...................... 707/5 |
| 2009/0171932 | A1* | 7/2009 | Yahia et al. ...................... 707/5 |
| 2010/0010877 | A1* | 1/2010 | Hunt et al. ...................... 705/10 |

FOREIGN PATENT DOCUMENTS

| CN | 101506795 A | 8/2009 |
| WO | 2008073633 A2 | 6/2008 |

OTHER PUBLICATIONS

Chaitman, Steven, "Welcome to Player Affinity Movies", Retrieved at << http://playeraffinity.com/movies-featured/welcome-to-player-affinity-movies.html >>, Apr. 27, 2010, pp. 4.
"The Music Recommender Face-Off", Retrieved at << http://blogs.sun.com/plamere/entry/the_music_recommender_face_off >>, Oct. 4, 2007, pp. 7.

(Continued)

*Primary Examiner* — Ajith Jacob
(74) *Attorney, Agent, or Firm* — Aaron Chatterjee; Judy Yee; Micky Minhas

(57) ABSTRACT

A system and method of recommending and rating content and/or for generating a determined affinity between content consumers and reviewers. The method includes determining a rating for one or more user-surveyed content items and determining a rating for one or more reviewer-surveyed content items for each of a plurality of content reviewers. Comparisons are then performed between user ratings and reviewer ratings for commonly surveyed content items. As a result, affinities between user(s) and content reviewers are established and the user is provided with reviews and ratings produced by high-affinity content reviewers.

20 Claims, 3 Drawing Sheets

(56) References Cited

OTHER PUBLICATIONS

Bruyn, et al., "Offering Collaborative-Like Recommendations When Data Is Sparse: The Case of Attraction-Weighted Information Filtering", Retrieved at << http://citeseerx.ist.psu.edu/viewdoc/download?doi=10.1.1.86.4675&rep=rep1&type=pdf >>, 2004, pp. 4.

Roh, et al., "A Cluster-indexing CBR Model for Collaborative Filtering Recommendation", Retrieved at << http://www.pacis-net.org/file/2003/papers/e-business/87.pdf >>, 7th Pacific Asia Conference on Information Systems, Jul. 10-13, 2003, p. 150-167.

State Intellectual Property Office of China, Office Action for Chinese Patent Application No. 201110339401.6, Jan. 24, 2014, 13 pages.

State Intellectual Property Office of the People's Republic of China, Second Office Action Issued in Chinese Patent Application No. 201110339401.6, Aug. 13, 2014, 7 pages.

* cited by examiner

CONTENT RECOMMENDATION SYSTEM AND METHOD

BACKGROUND

The Internet and other communication networks have grown in sophistication in terms of their offering of solutions to connect users with relevant content. Despite this, the Internet and other networks still constitute a vast wilderness of information in which it can be extremely difficult for users to identify information that is assured of being useful and/or interesting. Various approaches exist for addressing this problem, including collaborative filtering and various social recommendation tools.

For example, many e-commerce websites employ functionality that will recommend alternate or supplemental products to a user based on the user's browsing among particular items featured on the site. These recommendations in many cases are based on purchaser data accumulated by the website, for example, data which shows that users buying a first product are also likely to want to buy a second, related product. One issue with such an approach is that there is no mechanism for establishing that a given user will have preferences that are similar to other users of the website. Therefore, the recommendations can be very speculative, and these systems are therefore limited in the ability to provide relevant recommendations to users.

SUMMARY

The disclosure provides for a system and method of recommending content and/or for generating a determined affinity between content consumers and reviewers. In one aspect, the disclosure is directed to a method for predicting user affinity with preferences of a content reviewer. The method includes determining, for a user, a rating for one or more user-surveyed content items. Then, for each of a plurality of content reviewers, a rating is determined for one or more reviewer-surveyed content items. Ratings are then compared for the user-surveyed and reviewer-surveyed content items, typically for those that overlap between the two surveying entities. As a result of the comparison, affinities between user(s) and content reviewers are established. Then, for a selected item being considered by the user or for an item that may be of interest to the user, the user is provided with recommendations and/or reviews, which may include ratings, produced by high-affinity content reviewers. Furthermore, a computing system is provided that executes various steps, which may include those specified above and/or other steps, in order to identify high-affinity reviewers and provide high-quality recommendations and ratings or other reviews to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to systems and methods for predicting user interest in electronically-accessible content items (e.g., video and other digital media), and for identifying content reviewers who have preferences similar to those of a particular user. In many cases, the identification of these content reviewers is used to improve the quality of recommendations that are provided to the user. In many of the examples herein, a user will be described as having an affinity for an online content reviewer, such as a professional movie critic, fellow purchaser on an e-commerce website, etc. When used herein, "online" simply means that the identified information and entities are in communication with each other and accessible electronically. Therefore, the term can encompass public networks or collections of networks such as the Internet, as well as private or managed networks. Indeed, "online" contemplates any type of system or collections of systems that enable users to receive content recommendations and consume digital content items.

Figure 1:
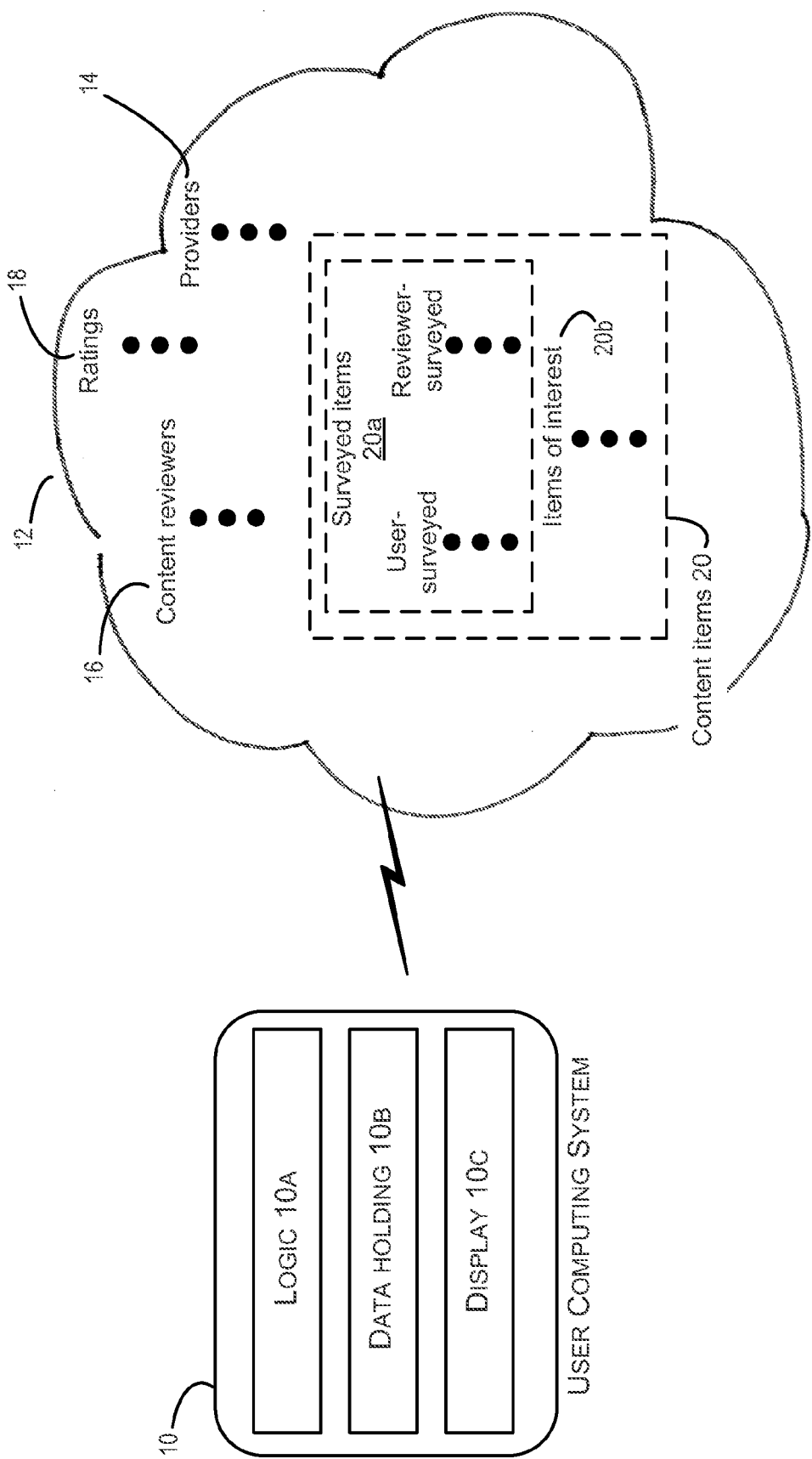
FIG. 1 is an example computing system and environment in which content recommendation systems and methods may be incorporated according to the examples discussed herein.

FIG. 1 depicts an example environment in which the systems and methods described herein may be employed. A user may use a computing device, such as exemplary computing system 10, in order to search for and gain access to content items available via computerized communications network 12, which may be the Internet or another system/network that enables access to content items.

As indicated, network 12 may include or enable access to plural content providers 14 that provide content, content reviewers 16, and reviews/ratings 18 of available content items. As used herein, the term "review" may refer to or include any type of information that enables a user to decide whether or not they are interested in obtaining or consuming a content item. For example, a review may include a written description of the content item (e.g., containing opinion, criticism, etc.), or it may include a rating of an item (e.g., one through five stars or other numerical or other assessments). Content providers 14 may be the source or location of content items 20, which may include surveyed items 20a (described below) and items of interest 20b to a user. The content items contemplated in the described examples may be music or video files (downloadable or streaming), other types of digital media, and/or any other type of content that can be accessed electronically using a computer.

In a first example, the depicted system may be used to predict user interest in a content item being considered, such as one of the content items 20b. For example, a user may be considering whether to purchase a streamable television episode, music file, podcast, etc. In this first example, interest is predicted by assessing a user's affinity toward one or more content reviewers 16. In particular, if the user rates certain content items highly, they will be presumed to favor online content reviewers who have rated those same items highly.

To assess affinities, the methods herein contemplate a survey of content items. Specifically, user ratings are received or inferred for one or more content items that the user has been exposed to. The user may have purchased these items, browsed to web pages featuring the items, purchased or viewed closely related items, etc. These items may be referred to as user-surveyed items. The surveyed items constitute accumulated information that enables knowledge of the user's preferences.

As briefly indicated above, the ratings may be explicit and/or inferred. Explicit ratings may include the familiar "star rating" system in which a user assigns a relatively higher or lower number of stars depending on their opinion of a particular content item. For example, a user may assign one star to a content item which the user dislikes. In another example, a user may assign five stars to a content item which the user likes. Inferred ratings may be calculated ratings which are generated from less explicit behaviors. For example, a user may exhibit user-initiated exposure behaviors, such as selecting and viewing of a webpage featuring the item, selecting to purchase/consume a closely related item, number and/or frequency of selected views and purchases, etc. Inferences may be strong or weak depending on the relationship of the reviewer to the type of content, or based upon the relatedness of the content item to other content items. Also, the inferred/ calculated rating may vary depending on the particular behavior. For example, three out of four stars may be assigned when the user simply browses to a page featuring the item. When an item is purchased, on the other hand, the inference may generate a higher rating, such as four stars. In another example, if a user were to purchase a certain make/model of camera, it might be presumed that a similar rating would attach to other similar cameras from the same manufacturer. In another example, if a user were to explicitly rate a movie with a particular actor, a similar rating might be assigned via inference to other movies with the same actor. In a user's music library, higher ratings could be assigned to songs that had been listened to a greater number of times. Still another example would be to infer high ratings/interest when a user watches an entire video clip. As evidenced by the examples above, a variety of methods may be used to generate inferred ratings for user-surveyed items.

Survey ratings may also be accumulated for a plurality of online content reviewers, such as reviewers 16. When these reviewers produce ratings for items that were also surveyed by the user, ratings comparisons may be made to arrive at user-reviewer affinity ratings. Typically, the ratings of the content reviewers are explicit, although inferred ratings may be used as well. For example, if a professional movie critic were to consistently rate movies from a particular director highly, it could be inferred that a similarly high rating would attach to another movie from the same director, even if not explicitly reviewed by the critic. Also, as with the user, inferences may be strong or weak depending on the relationship of the reviewer to the type of content, or based upon the relatedness of the content item to other content items. For example, it might be assumed that the director of a movie is a stronger determinant of the movie's quality than the cast members. On the other hand, it may be determined through analysis that a particular user in fact weighs the presence of a particular actor more heavily than other factors. Again, inferences may be arrived at through a variety of methods.

In any case, once inferred/calculated or explicit ratings are obtained for surveyed items, the surveyed items that are common to a user and a given online content reviewer may be compared to assess user-reviewer affinity. Various methods may be employed in the comparison and resulting affinity determination. For example, in the case of a large reviewer population, content reviewers that assign different ratings (e.g., lower ratings) may be discarded (assumed zero affinity). In another approach, the preferences of the online content reviewer would be discounted to the extent that their ratings of survey items differ from those of the user. One approach that may be employed is a mean square operation in which score differences are subjected to a mean square calculation in order to discount the weighting and affinity assigned to a particular content reviewer. For example, if a user assigned a four-star rating to an item, the mean square approach would discount a two-star critic rating much more deeply than a three-star critic rating. Also, it will be appreciated that in some cases it will be desirable to normalize ratings to accommodate different rating schemes (e.g., to provide an accurate comparison to an item rated on a 5-star scale with one rated on a 4-star scale).

In any event, the resulting affinities may be used in a variety of ways. For example, in the event a user is considering a particular item of interest (e.g., an item 20b), the user might be provided with reviews of that item only from reviewers with very high user-reviewer affinity scores. In one non-limiting example, the user might be provided with only two reviews of the item, but the two reviews would be from the reviewers (e.g., professional movie critics) that most closely align with the taste preferences that have been established for the user.

In another example, the system is used to predict a user's level of interest in an item 20b being considered for purchase, consumption, etc. This prediction may involve a composite rating of the item, in which the ratings from a plurality of content reviewers are incorporated into the composite rating. One approach is to weight the rating using affinities that have been established between the user and the reviewers that have reviewed/rated the item. In contrast to the previous example, the user is simply provided the composite rating instead of receiving the actual review from the online content reviewer, though it should be appreciated that a rating is itself a "review" in some sense. The approaches may of course be combined, such that the user would receive the composite rating along with descriptive reviews of the item being considered from high-affinity reviewers.

Figure 4:
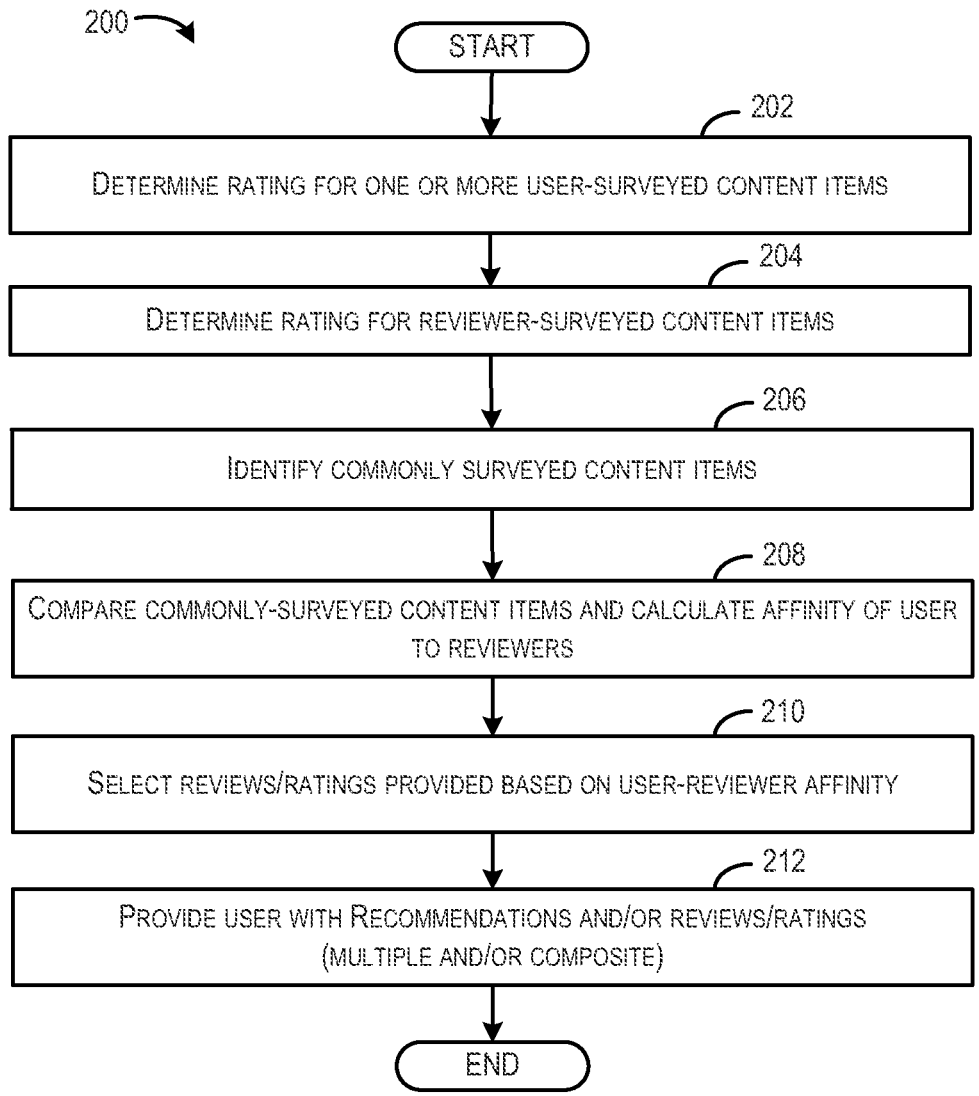
FIG. 4 is an example method for generating affinity assessments and responding to such assessments by providing ratings, other reviews and content recommendations.

FIG. 4 provides a flowchart description of an example method contemplated by the present disclosure. In method 200 (FIG. 2), user affinity to a content reviewer is accomplished by first determining a rating for one or more user-surveyed content items surveyed by a user, as shown at 202. As explained in other portions of this disclosure, "surveyed" means that a user or reviewer has interacted with a digital content item in a manner that enables the system to determine whether or not the user likes or dislikes the item, and possibly also the intensity of the preference. For example, rating a group of songs means that the user has surveyed those songs. Watching a video in its entirety can also be considered a "survey" of the video, because it enables the system to assume that the user liked the video. Continuing with FIG. 4, at 204, a rating for one or more reviewer-surveyed content items is determined for each of a plurality of content reviewers. As previously described, the ratings in steps 202 and 204 may be explicit or inferred. Then, at 206 and 208, user ratings and reviewer ratings of commonly-surveyed content items are compared to determine user-reviewer affinity. These steps may be iterative of course to account for multiple users and multiple reviewers. Finally, for a selected item being considered by the user, the user may be provided with selected reviews of the item being considered from high-affinity online content reviewers or relatively high-affinity online content reviewers (having higher affinity than other online content reviewers), as shown at 210 and 212. Additionally or alternatively, the method may include providing the user with a rating of the item being considered, as shown at 212. The method also can include providing high-quality recommendations to the user, and is not limited to providing assessments of items that are already being viewed or browsed by the user. As discussed above, such rating may be generated from ratings from multiple reviewers, and/or may be a composite rating generated using a weighting of user-reviewer affinities.

In some embodiments, the above described methods and processes may be applied to a computing system including one or more computers. In particular, the methods and processes described herein may be implemented as a computer application, computer service, computer API, computer library, and/or other computer program product. It is to be understood that virtually any computer architecture may be used without departing from the scope of this disclosure. In different embodiments, computing system 10 (FIG. 1) may take the form of a mainframe computer, server computer, desktop computer, laptop computer, tablet computer, home entertainment computer, network computing device, mobile computing device, mobile communication device, gaming device, etc.

Computing system 10 includes a logic subsystem 10a and a data-holding subsystem 10b. Computing system 10 may optionally include a display subsystem 10c, communication subsystem (not shown), and/or other components not shown in FIG. 1. Computing system 10 may also optionally include user input devices such as keyboards, mice, game controllers, cameras, microphones, and/or touch screens, for example.

Figure 2:
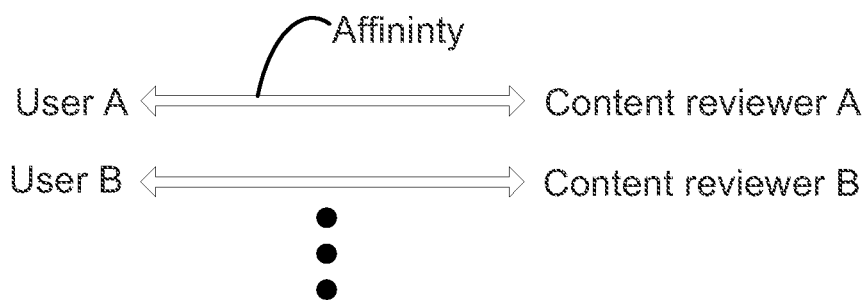
FIG. 2 is an example showing affinity correlations.
Figure 3:
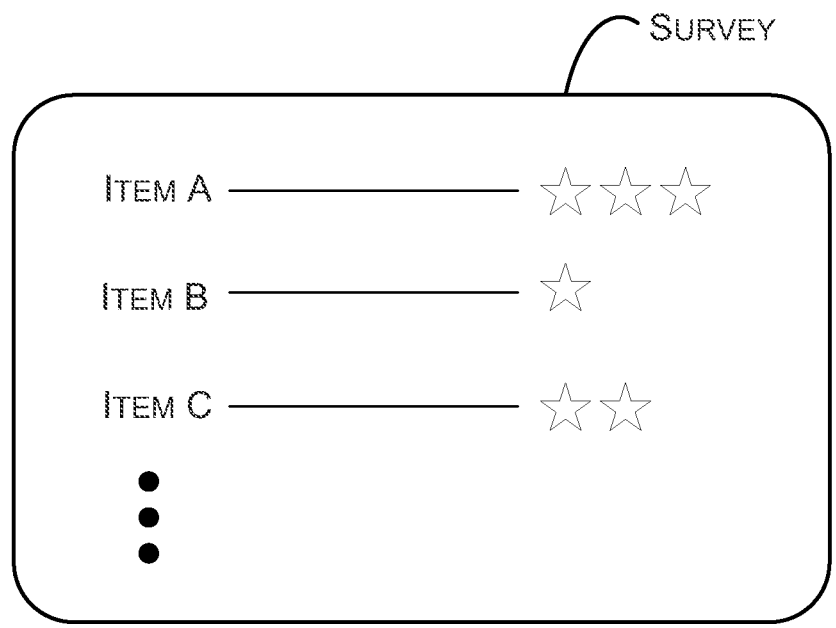
FIG. 3 depicts an example showing surveyed content items.

Logic subsystem 10a may include one or more physical devices configured to execute one or more instructions, such as instructions contained within data-holding subsystem 10b that are configured to determine ratings and calculate affinities, as in the exemplary methods of FIG. 2. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Data-holding subsystem 10b may include one or more physical, non-transitory, devices configured to hold data and/or instructions executable by the logic subsystem to implement the herein described methods and processes. When such methods and processes are implemented, the state of data-holding subsystem 10b may be transformed (e.g., to hold different data).

Data-holding subsystem 10b may include removable media and/or built-in devices. Data-holding subsystem 10b may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 10b may include devices with one or more of the following characteristics: volatile, nonvolatile, dynamic, static, read/write, read-only, random access, sequential access, location addressable, file addressable, and content addressable. In some embodiments, logic subsystem 10a and data-holding subsystem 10b may be integrated into one or more common devices, such as an application specific integrated circuit or a system on a chip.

The terms "module," "program," and "engine" may be used to describe an aspect of computing system 10 that is implemented to perform one or more particular functions. In some cases, such a module, program, or engine may be instantiated via logic subsystem 10a executing instructions held by data-holding subsystem 10b It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

When included, display subsystem 10c may be used to present a visual representation of data held by data-holding subsystem 10b. As the herein described methods and processes change the data held by the data-holding subsystem, and thus transform the state of the data-holding subsystem, the state of display subsystem 10c may likewise be transformed to visually represent changes in the underlying data. Display subsystem 10c may include one or more display devices utilizing virtually any type of technology. Such display devices may be combined with logic subsystem 10a and/or data-holding subsystem 10b in a shared enclosure, or such display devices may be peripheral display devices.

When included, a communication subsystem may be configured to communicatively couple computing system 10 with one or more other computing devices, such as devices that store or enable access to content items and online reviews. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 10 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. Also, the example systems and methods herein are not to be construed as being limited to those that solve a particular problem or issue. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing method of predicting user affinity with preferences of a content reviewer whose reviews are accessible via a computerized communications network, comprising:

determining at a computing device, for a user, a rating for one or more user-surveyed content items;

determining at the computing device, for each of a plurality of content reviewers, a rating for one or more reviewer-surveyed content items;

comparing at the computing device, for one or more commonly surveyed content items, ratings of the one or more user-surveyed content items with ratings of the one or more reviewer-surveyed content items;

based on said comparing step, determining at the computing device an individual user-reviewer affinity between the user and each of the plurality of content reviewers, wherein each user-reviewer affinity is specific to a commonality of reviews between the user and that single reviewer of the plurality of content reviewers and is not influenced by a commonality of reviews between the user and other reviewers of the plurality of content reviewers, and wherein the user-reviewer affinity between the user and a given content reviewer increases when commonly-surveyed items are similarly rated and decreases when commonly-surveyed items are dissimilarly rated; and recommending, at the computing device, a selected number of content items having a highest rating from a selected number of content reviewers for which a relatively high or highest individual user-reviewer affinity was determined over content reviewers having a relatively lower or lowest individual user-reviewer affinity of the plurality of content reviewers, where the selected number of content items that are provided are particularized to the user, such that for a second user who has differing individual user-reviewer affinities, that second user would be provided with different selected content items from different selected content reviewers than those provided to the user.

2. The method of claim 1, wherein determining the user-reviewer affinity between the user and each of the plurality of content reviewers includes a mean square operation performed on the one or more commonly surveyed content items.

3. The method of claim 1, where ratings for the one or more commonly surveyed content items from different reviewers have different rating scales, and said comparing includes, for each of the plurality of content reviewers, normalizing the ratings having different rating scales to a common ratings scale to produce normalized ratings, and comparing the normalized ratings for the one or more commonly surveyed content items.

4. The method of claim 3, where said comparing includes, for each of the plurality of content reviewers, a mean square operation performed on the one or more commonly surveyed content items.

5. The method of claim 1, further comprising providing a composite rating for the selected number of content items being recommended, in which said composite rating is generated for each of the selected number of content items by applying an individual user-reviewer affinity of a content reviewer as a weight to a rating of the content item provided by the content reviewer to produce an individual weighted rating of the content item, and the composite rating being based on the individual weighted ratings of the selected number of content reviewers.

6. The method of claim 1, where said determining, for the user, a rating for one or more user-surveyed content items, includes, absent an explicit user rating, inferring the rating of the one or more user-surveyed content items.

7. The method of claim 6, where said inferring is performed in response to user-initiated exposure to the one or more user-surveyed content items.

8. A computing method of predicting user interest in a content item that is accessible via a computerized communications network, comprising:
   determining at a computing device, for a user, a rating for one or more user-surveyed content items;
   determining at the computing device, for each of a plurality of content reviewers, a rating for one or more reviewer-surveyed content items;
   comparing at the computing device, for one or more commonly surveyed content items, ratings of the one or more user-surveyed content items with ratings of the one or more reviewer-surveyed content items of such content reviewer; and
   based on said comparing step, determining at the computing device an individual user-reviewer affinity between the user and each of the plurality of content reviewers, where each user-reviewer affinity is specific to a commonality of reviews between the user and that single reviewer of the plurality of content reviewers;
   determining at the computing device, for each of the plurality of content reviewers, an individual weighted rating for each of a plurality of content items reviewed by the content reviewer, the individual weighted rating for the content item being determined by applying the individual user-reviewer affinity of the content reviewer as a weight to a rating of the content item provided by the content reviewer;
   determining at the computing device, a composite rating for each of a plurality of content items having individual weighted ratings, the composite rating for the content item being based on the individual weighted ratings of each of the plurality of content reviewers for the content item; and
   recommending at the computing device a selected number of content items having a highest composite rating of the plurality of content items having composite ratings to the user.

9. The method of claim 8, where said comparing includes, for each of the content reviewers, a comparison of normalized ratings for the one or more commonly surveyed content items.

10. The method of claim 8, where said determining, for the user, the rating for one or more user-surveyed content items, includes, absent an explicit user rating, inferring the rating of the one or more user-surveyed content items.

11. The method of claim 10, where said inferring is performed in response to user-initiated exposure to the one or more user-surveyed content items.

12. The method of claim 10, where said inferring is performed in response to an association between the user and the selected content item or between the selected content item and another selected content item.

13. A computing system configured to predict user affinity with preferences of a content reviewer whose reviews are accessible via a computerized communications network, comprising:
   a data-holding subsystem containing instructions executable by a processor to:
      determine, for a user of the computing system, a rating for one or more user-surveyed content items;
      obtain, via interaction with the computerized communications network, and for each of a plurality of content reviewers, a rating for one or more reviewer surveyed content items;
      compare, for one or more commonly surveyed content items, ratings of the one or more user-surveyed content items with ratings of the one or more reviewer-surveyed content items of such content reviewer;
      based on said comparing step, determine an individual user-reviewer affinity between the user and each of the plurality of content reviewers, where each user-reviewer affinity is specific to a commonality of reviews between the user and that single reviewer of the plurality of content reviewers;
      determine for each of the plurality of content reviewers, an individual weighted rating for each content item reviewed by the content reviewer, the individual weighted rating for the content item being determined by applying the individual user-reviewer affinity of the content reviewer as a weight to a rating of the content item provided by the content reviewer;

determine a composite rating for each of the plurality of content items, the composite rating for the content item being based on the individual weighted ratings for the content item of each of the plurality of content reviewers for the content item;

obtain, for a selected content item being considered by the user or that will be recommended to the user, and based on said user-reviewer affinities between the user and the plurality of content reviewers, reviews for said selected content item from a selection of the plurality of content reviewers, where said selection is based on user-reviewer affinities between the user and the content reviewers, wherein said reviews are particularized to the user, such that for a second user considering the selected content item and who has differing user-reviewer affinities, that second user would be provided with different reviews as a result of said differing user-reviewer affinities; and provide the composite rating for the selected content item.

14. The computing system of claim 13, where ratings for one or more commonly surveyed content items from different reviewers have different rating scales, and said comparing includes, for each of the content reviewers, normalizing the ratings having different rating scales to a common ratings scale to produce normalized ratings, and comparing the normalized ratings for the one or more commonly surveyed content items.

15. The computing system of claim 13, where said determining, for the user, a rating for one or more user-surveyed content items, includes, absent an explicit user rating, inferring the rating of the one or more user-surveyed content items.

16. The computing system of claim 15, where said inferring is performed in response to user-initiated exposure to the one or more user-surveyed content items.

17. The computing system of claim 15, where said inferring is performed in response to assessment of a relationship between the user and the selected content item or a relationship between two different selected content items.

18. The method of claim 8, where such user-reviewer affinity determination is performed using a mean square operation for the one or more commonly surveyed content items in which larger rating differences between the user and a content reviewer of the plurality of content reviewers for the one or more commonly surveyed content items are discounted relative to smaller rating differences.

19. The method of claim 8, wherein the composite rating for a content item is based on individual weighted ratings of only a selected number of content reviewers having a higher or highest individual user-reviewer affinity with the user.

20. The computing device of claim 13, wherein the composite rating for a content item is based on individual weighted ratings of only a selected number of content reviewers having a higher or highest individual user-reviewer affinity with the user.

* * * * *